US012563525B2

(12) United States Patent (10) Patent No.: US 12,563,525 B2
Palenius et al. (45) Date of Patent: Feb. 24, 2026

(54) SYSTEMS, METHODS, AND COMPUTER PROGRAM PRODUCTS FOR DELAYING A USER EQUIPMENT PAGING OPERATION IN A NETWORK BASED ON PROPAGATION CHANNEL CHARACTERISTICS

(71) Applicant: SONY GROUP CORPORATION, Tokyo (JP)

(72) Inventors: Torgny Palenius, Barseback (SE); Lars Nord, Lund (SE)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 18/742,157

(22) Filed: Jun. 13, 2024

(65) Prior Publication Data

US 2024/0334389 A1 Oct. 3, 2024

Related U.S. Application Data

(63) Continuation of application No. 17/293,682, filed as application No. PCT/US2019/062396 on Nov. 20, 2019, now abandoned.

(30) Foreign Application Priority Data

Nov. 21, 2018 (SE) .................................... 1830345-3

(51) Int. Cl.
  *H04W 64/00* (2009.01)
  *H04W 24/10* (2009.01)
(52) U.S. Cl.
  CPC ......... *H04W 64/006* (2013.01); *H04W 24/10* (2013.01)

(58) Field of Classification Search
  CPC ............................ H04W 64/006; H04W 24/10
  USPC ........................................................... 455/458
  See application file for complete search history.

(56) References Cited

U.S. PATENT DOCUMENTS

| | | |
|---|---|---|
| 9,088,959 B1 | 7/2015 | Sitaram et al. |
| 2005/0201311 A1 | 9/2005 | Willey et al. |
| 2006/0246924 A1 | 11/2006 | Balasubramanian et al. |
| 2013/0339438 A1 | 12/2013 | Cherian et al. |
| 2017/0367044 A1 | 12/2017 | Fujishiro et al. |
| 2018/0054799 A1 | 2/2018 | Starsinic et al. |
| 2019/0159227 A1 | 5/2019 | Talebi Fard et al. |

FOREIGN PATENT DOCUMENTS

| | | |
|---|---|---|
| CN | 101330312 A | 12/2008 |
| CN | 103428874 A | 12/2013 |
| CN | 104604158 A | 5/2015 |

(Continued)

OTHER PUBLICATIONS

First Chinese Office Action and Search Report corresponding to CN 201980076509.5; Issued: Sep. 4, 2023 (24 pages, including English translation).

(Continued)

*Primary Examiner* — Joel Ajayi
(74) *Attorney, Agent, or Firm* — Myers Bigel, P.A.

(57) ABSTRACT

A method of operating a network node includes receiving a request to trigger a paging procedure based on receipt of downlink data in a core network from an application server (AS) and determining, responsive to receiving the request to trigger the paging procedure, whether to delay paging of a user equipment (UE) based on characteristics of a propagation channel for data communication associated with the UE.

20 Claims, 15 Drawing Sheets

(56)                References Cited

FOREIGN PATENT DOCUMENTS

| | | | |
|---|---|---|---|
| CN | 105722134 | A | 6/2016 |
| CN | 106304337 | A | 1/2017 |
| CN | 107925985 | A | 4/2018 |
| WO | 2018170706 | A1 | 9/2018 |

OTHER PUBLICATIONS

International Search Report and Written Opinion corresponding to PCT/US2019/062396; dated Feb. 14, 2020 (13 pages).

Second Chinese Office Action and Search Report corresponding to CN 201980076509.5; Issued Mar. 1, 2024, (20 pages, including English translation).

CATT , "Solution on Delayed MT data transmission for power saving", 3GPP TSG-SA WG2 Meeting #128, Doc # S2-186911. Vilnius, Lithuania Jul. 2-6, 2018, (3 pages).

Ericsson , "NB-IoT—Paging", 3GPP TSG-RAN WG1 Meeting #84, TDoc # R1-160270; St Julian's, Malta, Feb. 15-19, 2016, (11 pages).

Ericsson , "NB-IoT-Paging", 3GPP TSG-RAN WG1 Meeting #84; Doc. # R1-160270. St. Julian's, Malta. Feb. 15-16, 2016, (11 pages).

OPPO, NEC , "Solution for KI5: Delayed Paging Response", SA WG2 Meeting #127bis, May 28-Jun. 1, 2018, Newport Beach, VA, (3 pages).

Qualcomm Incorporated , "Network triggered service request procedure", SA WG2 Meeting #118bis, Doc # S2-170094. Spokane, WA, USA Jan. 16-20, 2017, (8 pages).

Third Chinese Office Action corresponding to CN 201980076509.5; Issued May 22, 2024, (15 pages, including English translation).

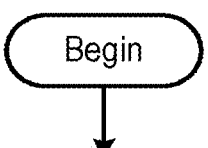

The characteristics of the propagation channel are based on data communication channel information comprising sounding reference symbols, SRS, transmitted from the UE, a random access channel, RACH, report that comprises a number of preambles used during an RACH attempt, a radio link failure, RLF, report that comprises radio link failure information or cellular handover information associated with the UE, a measurement report, logMeasReport, that comprises power and quality measurements on a radio access network, RAN, node that currently serves the UE, or a history report, mobilityHistoryReport, that comprises information on UE movement between recently visited RAN nodes

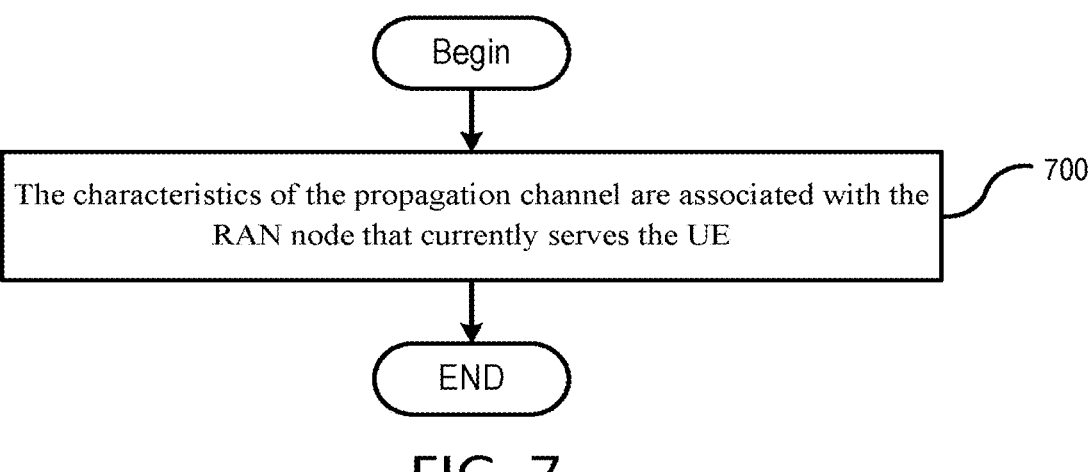

The characteristics of the propagation channel are associated with the RAN node that currently serves the UE

Begin

The characteristics of the propagation channel are associated with a RAN node that has previously served the UE — 800

END

Begin

At least some of the data communication channel information is received from the UE — 900

END

Begin

The network node comprises a radio access network, RAN, node or a core network node — 1000

END

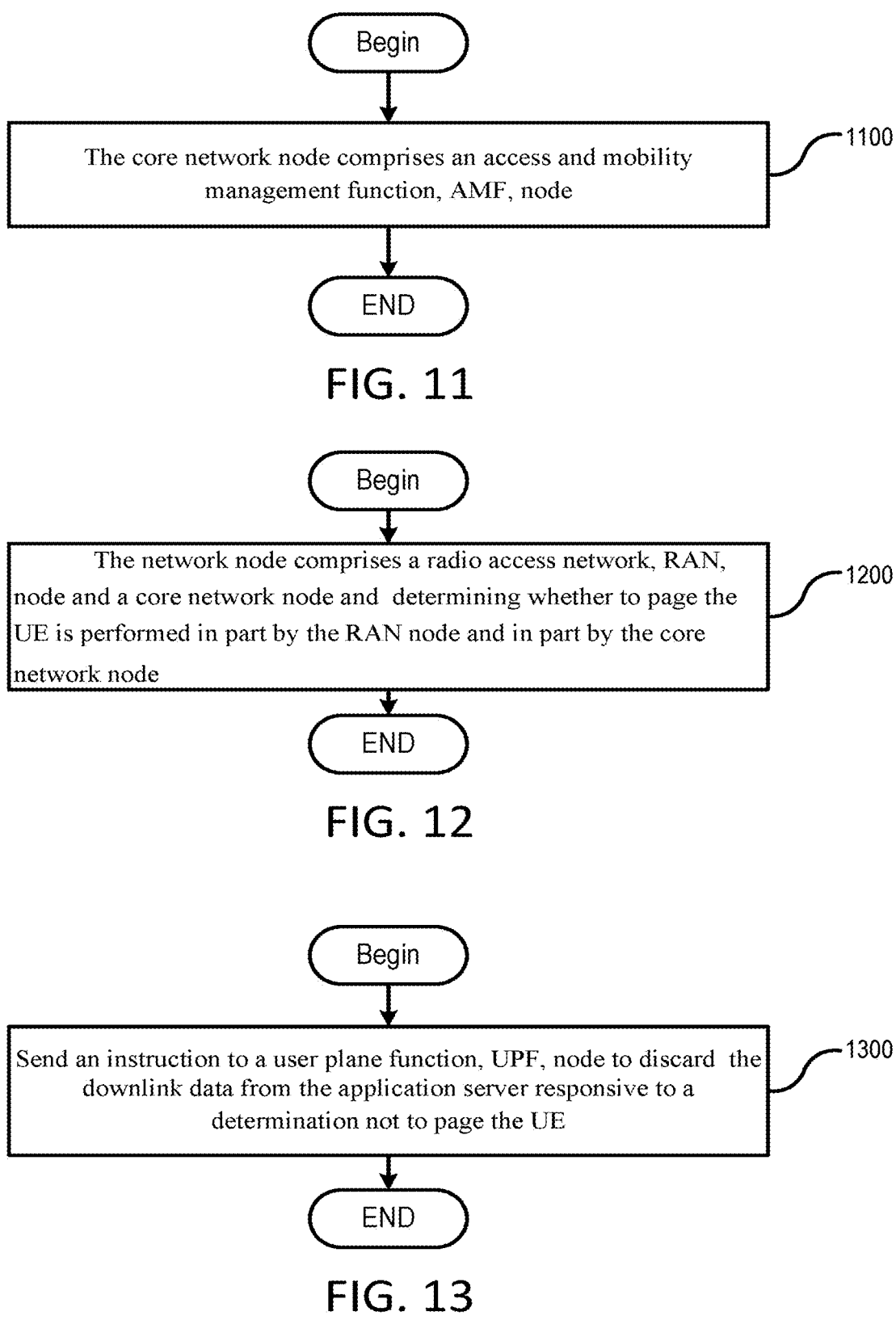

Begin

The core network node comprises an access and mobility management function, AMF, node ⌐1100

END

FIG. 11

Begin

The network node comprises a radio access network, RAN, node and a core network node and determining whether to page the UE is performed in part by the RAN node and in part by the core network node ⌐1200

END

FIG. 12

Begin

Send an instruction to a user plane function, UPF, node to discard the downlink data from the application server responsive to a determination not to page the UE ⌐1300

END

FIG. 13

Begin

Send a notification to the AS of a determination not to page the UE — 1400

END

Begin

The notification comprises a timer value specifying a delay for use by the AS before re-sending the downlink data to the network node — 1500

END

Begin

Send a second notification to the AS requesting re-sending of the downlink data — 1600

END

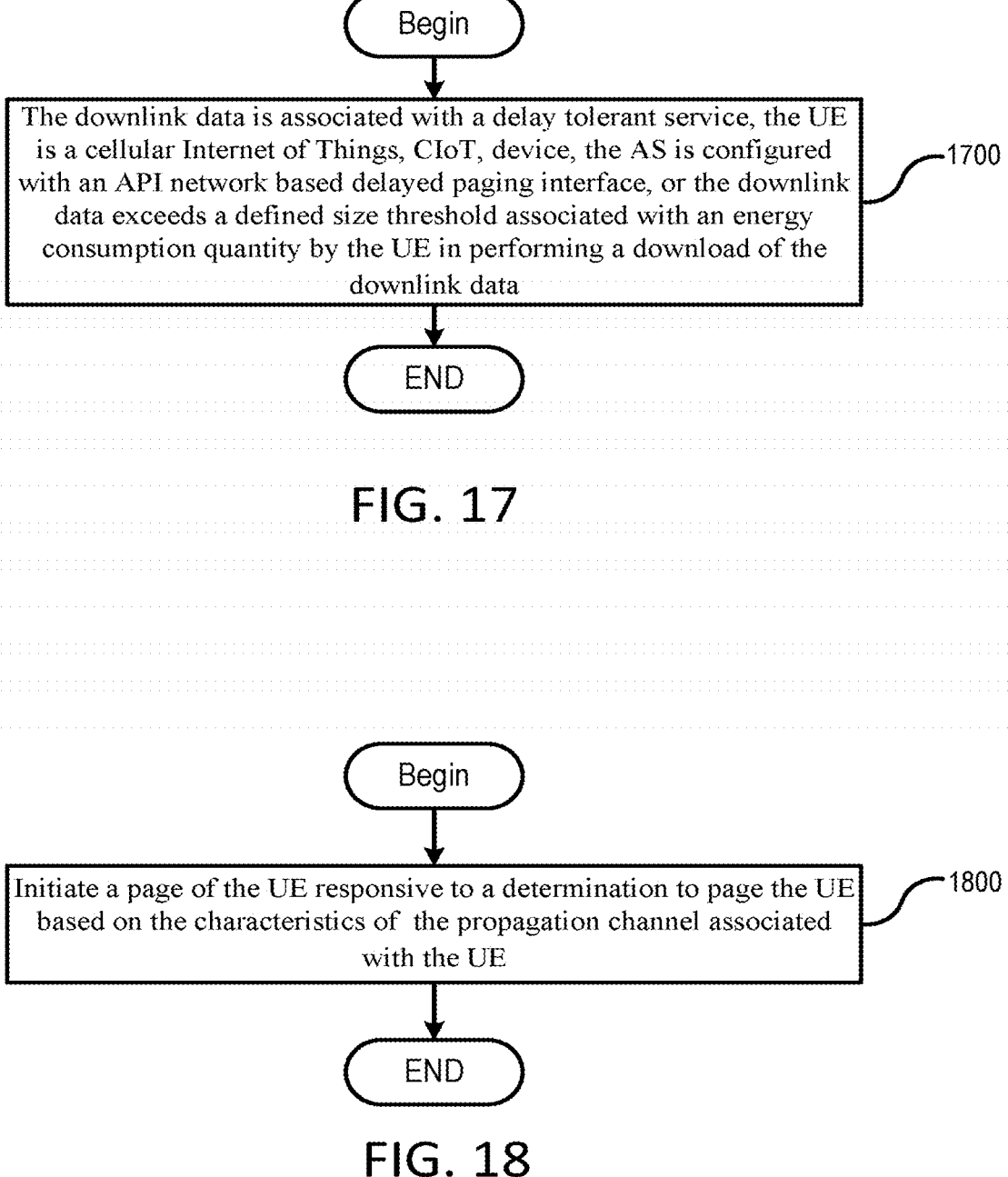

Begin

The downlink data is associated with a delay tolerant service, the UE is a cellular Internet of Things, CIoT, device, the AS is configured with an API network based delayed paging interface, or the downlink data exceeds a defined size threshold associated with an energy consumption quantity by the UE in performing a download of the downlink data ⟋1700

END

FIG. 17

Begin

Initiate a page of the UE responsive to a determination to page the UE based on the characteristics of the propagation channel associated with the UE ⟋1800

END

FIG. 18

Begin

Transmit a paging message from a radio access network, RAN, node that serves the UE to the UE responsive to initiating the page of the UE                1900

Receive at the RAN node that serves the UE a wait indication from the UE indicating a delay in transmission of a response to the paging message                1910

END

Begin

The network node comprises the RAN node that serves the UE                2000

END

SYSTEMS, METHODS, AND COMPUTER PROGRAM PRODUCTS FOR DELAYING A USER EQUIPMENT PAGING OPERATION IN A NETWORK BASED ON PROPAGATION CHANNEL CHARACTERISTICS

CROSS-REFERENCE TO RELATED APPLICATION

This application is a continuation of U.S. application Ser. No. 17/293,682, filed on May 13, 2021, which is a 35 U.S.C. § 371 national stage application of PCT Application No. PCT/US2019/062396, filed Nov. 20, 2019, which claims priority to Swedish Patent Application No. 1830345-3, filed Nov. 21, 2018, the entire contents which are incorporated herein by reference in their entireties. The above-referenced PCT Application was published in the English language as International Publication No. WO 2020/106829 A1 on May 28, 2020.

FIELD

The present inventive concepts relate generally to wireless communication networks and, more particularly, to user equipment (UE) paging communications in wireless communication networks.

BACKGROUND

Wireless communication networks, such as those based on the 3rd Generation Partnership Project (3GPP) defined Universal Mobile Telecommunications System (UMTS) and Long Term Evolution (LTE) architecture, are able to support more sophisticated services than simple voice and messaging services offered by previous generations of wireless communication networks. For example, with the improved radio interface and enhanced data rates provided by LTE systems, a user is able to enjoy high data rate applications such as mobile video streaming and mobile video conferencing that would previously only have been available via a fixed line data connection. The demand to deploy improved networks is, therefore, strong and the coverage area of these networks, i.e. geographic locations where access to the networks is possible, is expected to increase rapidly.

There is expected to be an increasing need for future wireless communications networks to efficiently support communications with a wider range of devices associated with a wider range of data traffic profiles and types than supported by current systems. For example, it is expected future wireless communications networks will be expected to efficiently support communications with devices including reduced complexity devices, machine type communication devices, high resolution video displays, virtual reality headsets and the like. Some of these different types of devices may be deployed in very large numbers, for example low complexity devices for supporting the "The Internet of Things" (IoT), and may typically be associated with the transmissions of relatively small amounts of data with relatively high latency tolerance, whereas other types of device, for example supporting high-definition video streaming, may be associated with transmissions of relatively large amounts of data with relatively low latency tolerance.

In view of IoT and other advances, there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

5G is the new generation of radio systems and network architecture delivering extreme broadband and ultra-reliable, low latency connectivity and massive networking for the IoT to enable the programmable world. Example use cases currently of interest for next generation wireless communication systems include so-called Narrowband IoT (NB-IoT), defined in the 3GPP Release 13.

When a user equipment (UE) is in an area with relatively poor or weak coverage, the UE may use significantly more power to download data, such as a software or firmware upgrade. For UEs that are cellular IoT (CIoT) devices, an extensive sensor report to be uploaded to an application server, for example, may similarly consume relatively large amounts of power. The power consumption of downloading or uploading data may increase during times of poor downlink (DL) or uplink (UL) channel quality, respectively, due to high UE Tx power and/or due to long activity time to send the data as the transmitted code block size decreases (low coding rate) and the number of repetitions used to send the packets increases. This may result in an increase in consumed energy and, as a result, the data transmission may drain the battery in the UE more rapidly.

One UE based approach to reduce power consumption caused by poor communication channel quality involves allowing the UE to delay a data download or upload until such a time as the channel quality improves when communication the data is not time sensitive. For example, an option may allow the UE to wait to transmit a paging response in certain conditions (e.g., when the condition of the radio network between the UE and the Radio Access Network (RAN) node is poor). By delaying the paging response until the quality of the communication channel improves, power consumption of the UE may be improved. For example, the estimated uplink (UL) power to reach the RAN node when the quality of the radio network is good may be less than when the quality of the radio network is poor. As a result, by waiting for the quality of the radio network to improve, the UE may be able to reduce the amount of power needed for the UL operation. Thereby power consumption of the UE can be enhanced because the transmission power is reduced and, in some cases, retransmissions can be avoided.

In addition, a paging message is often a prelude to the UE performing a DL operation to download data. Delaying the response to the paging message may also delay the DL operation, which was the rationale for the paging message. By delaying the response until a better channel condition exists, an increased data rate may be achieved for a fixed data allocation as the efficient coding rate can be higher (less redundancy bits). The increased data rate may reduce a communication time used for the DL operation, and, thereby, the power consumption may be reduced.

The UE may indicate its support for a delayed paging response to the RAN node (e.g., during registrations with the network). A delayed paging response is proposed in "3GPP; Technical Specification Group Services and System Aspects; Study on Cellular IoT support and evolution for the 5G System (Release 16) v1.0.0 (2018-09)," Solution 33, pp 192-195.

A drawback to the UE delaying a response to a page is the delay itself. During this time the network does not know if the UE is still within the paged area; as a result, the network may escalate the paging to wider area. This may increase the use of network paging resources and trigger other UEs to check if the paging indication is intended for them.

Because of this drawback, the allowed delay for a UE to respond to a page may be quite limited. In many circumstances the variations in the quality of the propagation channel are relatively slow, e.g. the rate at which device moves between a good coverage area and an area with poor coverage. As a result, the propagation channel may not improve during the allowed delay and the UE may be required to respond to the page later to download the data, which will just cost extra power as the data could have been downloaded earlier in response to the page under similar channel conditions. If, for example, the data to be downloaded is a software update, then it may not be critical to begin the download after the allowed delay for the UE to respond to the page has elapsed. In most cases the UE can wait days or weeks until a future paging cycle commences when the channel conditions are improved before it is downloaded.

SUMMARY

The inventive concepts described herein provide for the ability to delay downloading delay tolerant data to a UE based on an expectation that the UE power consumption may be relatively high due to the characteristics of the propagation channel. The UE paging process may be delayed in the network at a core network node and/or a RAN node. The halting of the UE paging event may be based on historical and/or current characteristics of a propagation channel for data communication associated with the UE. For delay tolerant data, it may be more efficient to delay paging the UE until propagation channel conditions have improved so as to improve throughput and reduce energy consumption even if the delay is for days or even weeks.

According to some embodiments of the inventive concept, a method of operating a network node comprises receiving a request to trigger a paging procedure based on receipt of downlink data in a core network from an application server (AS) and determining, responsive to receiving the request to trigger the paging procedure, whether to delay paging of a user equipment (UE) based on characteristics of a propagation channel for data communication associated with the UE.

In other embodiments, the propagation channel comprises a radio wave propagation model.

In still other embodiments, the characteristics of the propagation channel are based on information comprising measurements of sounding reference symbols (SRS) transmitted from the UE, a random access channel (RACH) report that comprises a number of preambles used during an RACH attempt, a radio link failure (RLF) report that comprises radio link failure information or cellular handover information associated with the UE, a measurement report, logMeasReport, that comprises power and quality measurements on a radio access network (RAN) node that currently serves the UE, or a history report, mobilityHistoryReport, that comprises information on UE movement between recently visited RAN nodes.

In still other embodiments, the characteristics of the propagation channel are associated with the RAN node that currently serves the UE.

In still other embodiments, the characteristics of the propagation channel are associated with a RAN node that has previously served the UE.

In still other embodiments, at least some of the data communication channel information is received from the UE.

In still other embodiments, the network node comprises a RAN node or a core network node.

In still other embodiments, the core network node comprises an access and mobility management function (AMF) node.

In still other embodiments, the network node comprises a RAN node and a core network node. Determining whether to delay paging of the UE is performed in part by the RAN node and in part by the core network node.

In still other embodiments, the method further comprises sending an instruction to a user plane function (UPF) node to discard the downlink data from the application server responsive to a determination to delay paging of the UE.

In still other embodiments, the method further comprises sending a notification to the AS of a determination not to page the UE.

In still other embodiments, the notification comprises a timer value specifying a delay for use by the AS before re-sending the downlink data to the network node.

In still other embodiments, the notification is a first notification, the method further comprising sending a second notification to the AS requesting re-sending of the downlink data.

In still other embodiments, the downlink data is associated with a delay tolerant service, the UE is a cellular Internet of Things, CIoT, device, the AS is configured with an API network based delayed paging interface, or the downlink data exceeds a defined size threshold associated with an energy consumption quantity by the UE in performing a download of the downlink data.

In still other embodiments, the method further comprises initiating a page of the UE responsive to a determination to page the UE based on the characteristics of the propagation channel associated with the UE and transmitting a paging message from a RAN node that serves the UE to the UE responsive to initiating the page of the UE.

In still other embodiments, the network node comprises the RAN node that serves the UE.

In still other embodiments, the UE is in an RRC_inactive state and the network node comprises a RAN node. The method further comprises receiving the downlink data from the AS directly from a UPF node at the RAN node. Determining whether to page the UE is performed by the RAN node.

According to some embodiments of the inventive concept, a method of operating a core network node comprises receiving a request to page a UE from a session management function (SMF) node, the SMF node having received Downlink Data Notification from the user plane function node (UPF) or having data stored thereon that was received from a network exposure function (NEF) node for downloading to the UE and determining, responsive to receiving the request to page the UE, whether to delay paging of the UE based on characteristics of a propagation channel for data communication associated with the UE.

In further embodiments, the characteristics of the propagation channel are based on information comprising measurements of sounding reference symbols (SRS) transmitted from the UE, a random access channel (RACH) report that comprises a number of preambles used during an RACH attempt, a radio link failure (RLF) report that comprises radio link failure information or cellular handover information associated with the UE, a measurement report, logMeasReport, that comprises power and quality measurements on a radio access network (RAN) node that currently serves the UE, or a history report, mobilityHistoryReport, that comprises information on UE movement between recently visited RAN nodes.

In still further embodiments, the core network node comprises an AMF node.

According to some embodiments of the inventive concept, a network node comprises a processor and a memory coupled to the processor and comprising computer readable program code embodied in the memory that is executable by the processor to perform operations comprising: receiving a request to trigger a paging procedure based on receipt of downlink data in a core network from an AS and determining, responsive to receiving the request to trigger the paging procedure, whether to delay paging of a UE based on characteristics of a propagation channel for data communication associated with the UE.

In other embodiments, the network node comprises a RAN node or a core network node.

In still other embodiments of the inventive concept, the core network node comprises an AMF node.

In still other embodiments of the inventive concept, the network node comprises a RAN node and a core network node. Determining whether to delay paging of the UE is performed in part by the RAN node and in part by the core network node.

According to some embodiments of the inventive concept, a computer program product comprises a tangible computer readable storage medium comprising computer readable program code embodied in the medium that is executable by a processor to perform operations comprising: receiving a request to trigger a paging procedure based on receipt of downlink data in a core network from an AS and determining, responsive to receiving the request to trigger the paging procedure, whether to delay paging of a UE based on characteristics of a propagation channel for data communication associated with the UE.

According to some embodiments of the inventive concept, a core network node comprises a processor and a memory coupled to the processor and comprising computer readable program code embodied in the memory that is executable by the processor to perform operations comprising: receiving a request to page a UE from a session management function (SMF) node, the SMF node having received Downlink Data Notification from the user plane function node (UPF) or having data stored thereon that was received from a network exposure function (NEF) node for downloading to the UE; and determining, responsive to receiving the request to page the UE, whether to delay paging of the UE based on characteristics of a propagation channel for data communication associated with the UE.

In further embodiments, the core network node comprises an access and mobility management function (AMF) node.

According to some embodiments of the inventive concept, a computer program product comprises a tangible computer readable storage medium comprising computer readable program code embodied in the medium that is executable by a processor to perform operations comprising: receiving a request to page a (UE) from a session management function (SMF) node, the SMF node having received Downlink Data Notification from the user plane function node (UPF) or data stored thereon that was received from a network exposure function (NEF) node for downloading to the UE and determining, responsive to receiving the request to page the UE, whether to delay paging of the UE based on characteristics of a propagation channel for data communication associated with the UE.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

BRIEF DESCRIPTION OF THE DRAWINGS

Other features of embodiments will be more readily understood from the following detailed description of specific embodiments thereof when read in conjunction with the accompanying drawings, in which:

FIGS. 4-22 are flowcharts that illustrate delaying a UE paging operation in a network based on propagation channel characteristics in accordance with some embodiments of the inventive concept;

DETAILED DESCRIPTION

Figure 1:
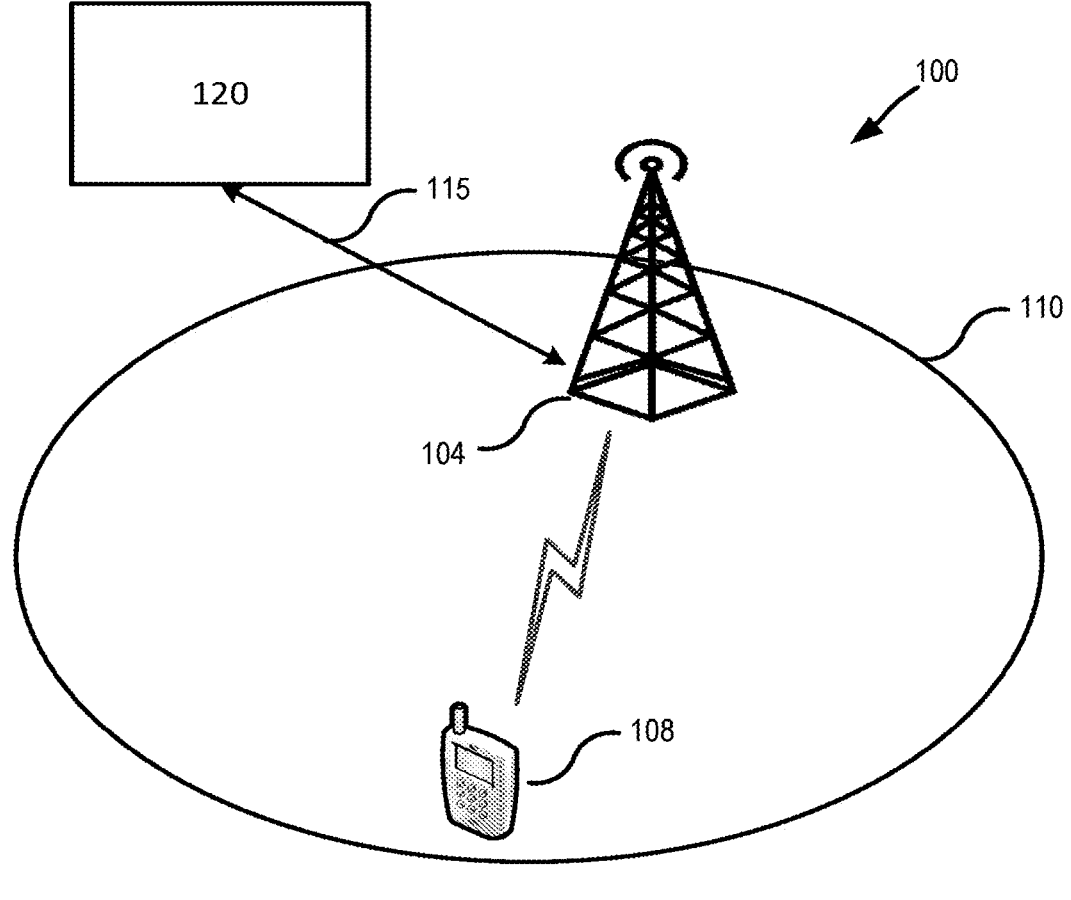
FIG. 1 is a diagram of a wireless communication network within a cell having a radio access network (RAN) node in communication with a user equipment (UE) in accordance with some embodiments of the inventive concept.

In the following detailed description, numerous specific details are set forth to provide a thorough understanding of embodiments of the present disclosure. However, it will be understood by those skilled in the art that the present invention may be practiced without these specific details. In some instances, well-known methods, procedures, components, and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Some embodiments of the inventive concept stem from a realization that when a user equipment (UE) is in an area with relatively poor or weak coverage, the UE may use significantly more power to download data and/or to upload data. One UE based approach to reduce power consumption caused by poor communication channel quality involves allowing the UE to delay a data download or upload until such a time as the channel quality improves when communication the data is not time sensitive. For example, the UE may wait to transmit a paging response in certain conditions, such as those times when the communication channel quality is poor. By delaying the paging response until the quality of the communication channel improves, power consumption of the UE may be improved. When the UE delays in sending a response to a page, the network may be unable to tell if the UE is still within the paged area, which may result in the network escalating the paging to a wider area thereby increasing use of network paging resources and causing other UEs to determine whether a page indication is intended for them. If the delay in which the UE responds to a page is shortened, however, then the communication channel quality may not have improved sufficiently to reduce power consumption for performing the data download and/or upload.

The inventive concepts described herein provide for the ability to delay downloading delay tolerant data to a UE based on an expectation that the UE power consumption may be relatively high due to the characteristics of the propagation channel. Moreover, the UE paging process may be delayed in the network at a core network node and/or a RAN node instead of or in addition to at the UE. The halting of the UE paging event may be based on historical and/or current characteristics of a propagation channel for data communication associated with the UE. For delay tolerant data, it may be more efficient to delay paging the UE until propagation channel conditions have improved so as to improve throughput and reduce energy consumption even if the delay is substantially longer than the next eDRX cycle, such as days or weeks.

The decision to delay the download may be based on the available propagation channel information and on the propagation channel history. The decision can be performed in the radio access network (RAN) node, in the core network, e.g. in the access and mobility management function (AMF) node or in both the RAN node and in the core network. Propagation channel measurements may be collected in the UE and in the network to collect information to establish a baseline performance level. The decision of whether to page a UE can be based on the current propagation channel quality for a connection and, in some embodiments, the current propagation channel quality may be compared with propagation channel quality information, such that the decision of whether to page may be based on a degree of deviation between the current propagation channel quality and historical norms.

In contrast to techniques where data downloading and/or uploading is delayed through the UE delaying a response to a network page, embodiments of the present inventive concept are based on halting paging in the network before a page is sent to the UE. The paging process may be completely halted and may be restarted from the application server (AS) or application function (AF) at a later time. As a result, a RAN and/or core network node does not need to store the download data that triggered the paging and save paging resources in the network. When propagation channel conditions are expected to change relatively slowly, e.g., due to slow UE mobility, it may be better to halt and restart the process later based on statistics makes it probable that propagation channel conditions will improve. The AS or AF may try to resend the download data in a later paging interval based on a preset timer or notification from the core network.

When the decision to halt the paging process for the download data is decided in the network, such as in a RAN node and/or a core network node, before any page is sent to the UE, the UE may not be affected. The paging activity may be delayed till a time when the needed energy to download the data has decreased. Moreover, the present embodiments based on postponing paging in the network may work in conjunction with techniques based on the UE delaying a paging response.

In a wireless communication network in which a determination whether to delay UE paging is performed in the network, e.g., in a RAN node and/or a core network node, the inventive concepts described herein provide multiple technical advantages: 1) the core network and/or RAN can improve UE power consumption and use paging resources more efficiently; 2) the core network and/or AN may estimate UE mobility and cell coverage based on channel measurements made in the network and/or provided from the UE; 3) the core network and/or RAN may gather data on propagation channel quality and mobility when a UE uploads data to an AS or AF; 4) the core network and/or RAN may use UE reported data on propagation channel quality and/or other characteristics to estimate UE mobility and cell coverage; 5) the core network and/or the RAN may request a UE to upload data, such as sensor information; 6) the core network and/or the RAN may only page a UE when a determination is made that the likelihood that the UE is in an area of good coverage and relatively high channel quality is high; 7) the core network and/or the RAN may not page a UE when the propagation channel quality is likely to be poor, which may reduce UE power consumption and reduce power consumption in other UEs in the same paging group; 8) the core network and/or the RAN may not page a UE when the propagation channel quality is likely to be poor thereby conserving paging resources; and 9) the core network and/or the RAN may determine whether to page a UE based on current and/or historical characteristics of a propagation channel for data communication associated with a UE, thereby allowing random-access channel (RACH) resources to be conserved as a UE need not delay paging by not responding to a page or by sending a wait indicator message to the network informing the network that the paging protocol should be delayed.

FIG. 1 is a diagram of a wireless communication network 100 within a cell 110 having a radio access network (RAN) node 104 in communication with a user equipment (UE) 108 in accordance with some embodiments of the inventive concept. The UE 108 may be in wireless communication with the RAN node 104. The RAN node 104 may be a node that communicates with the UE 108 and may also be referred to as a node B, an access point, an enhanced node B (eNB) a next-generation node B (gNB) and the like. The RAN node 104 can be responsible for mobility and can also be responsible for radio resource control (RRC) signaling. In some embodiments, the wireless communication network 100 may provide a Uu radio interface between the UE 108 and the RAN node 104 to facilitate radio communications therebetween.

The RAN node 104 may be a network node of the wireless communication network 100, and may provide communication coverage for a particular geographic area, such as that covered by the cell 110. The RAN node 104 may be further connected to a core network (CN) 220. In some embodiments, the wireless communication network 100 can be a 3GPP LTE network and the RAN node 104 can be an eNB apparatus, a gNB apparatus, or a base station subsystem (BSS), nevertheless the example is not limited to this type of network. As an example, the wireless communication network 100 can be a 5G, New Radio (NR), LTE, UMTS, Global System for Mobile (GSM), General Packet Radio Services (GPRS), and/or Enhanced Data for Global Evolution (EDGE) network. Depending on the type of network, the RAN node 104 can be of different types and can be interconnected within the wireless communication network 100 in different ways. The RAN node 104 is therefore not limited to an eNB/gNB and can comprise any device or system suitable to provide a wireless connection to UE 108. In addition, various network node names and message names are used herein to describe entities and messages in the wireless communication network. For convenience, the network node names and message names used include those from a 5G system, but it should be understood that corresponding nodes and messages in other generation wireless networks can also apply.

In some embodiments, RAN node 104 can be connected via an interface 115 to the core network 120. In some embodiments, the core network 120 may include servers and/or databases for providing services (such as data communications, voice calls, and/or VoIP calls) to the UE 108 connected via the wireless communication network 100. In particular, the core network 120 may include Mobility Management Entities (MMEs), Applications Servers, and Gateways for connection with other networks. In a 5G system, the MME functionality may be divided into multiple parts, such as an Access and Mobility Management Function (AMF), a Session Management Function (SMF), and/or a User Plane Function (UPF). The AMF may be responsible for paging messages to the UE 108. Communication between the core network 120 and the UE 108 may be relayed by the RAN node 104. For example, the RAN node 104 may relay a communication from the core network 120 but the RAN node 104 may not be aware of the context of the data. In other words, the RAN node 104 may, in some embodiments, relay the communication that is directly between the core network 220 and the UE 108.

An objective of the MTC (Machine Type Communication) and NB-IoT is to specify a radio access for cellular internet of things (CIoT) that addresses improved indoor coverage, support for a massive number of low throughput devices, low delay sensitivity, ultra-low device cost, low device power consumption, and/or optimized network architecture.

NB-IoT provides approaches regarding paging procedures that accommodate the potential for longer idle times in IoT devices and lower power consumption. In NB-IoT, a system frame number (SFN)-based discontinuous reception (DRX) or extended DRX (eDRX) with a paging time window (PTW) may be used. DRX and eDRX are methods used in mobile communication networks to conserve the battery of a UE 108. The UE 108 and the mobile communication network negotiate phases in which downlink (DL) data transfer may occur and/or the idle mode DRX/eDRX interval. During other times, the UE 108 may turn its receiver off and enter a low power state. The UE 108 may monitor all its paging occasions (POs) in the PTW. In some embodiments, the extended DRX cycle length and PTW size may be negotiated between the UE and CN during an ATTACH/tracking area update (TAU). In some embodiments, the paging messages to the UE 108, including retransmissions of the paging messages, may be controlled by the core network 120 and/or the RAN node 104, and may be relayed to the UE by the RAN node 104. In some embodiments, the paging messages to the UE 108, including retransmissions of the paging messages, may be controlled by the core network 120 and/or the RAN node 104.

One technique for a UE 108 to reduce power consumption in the UE 108 is to add an option to the paging communication between the UE 108 and the RAN node 104 (e.g., an eNB/gNB). For example, an option may allow the UE 108 to wait to transmit a paging response in certain conditions (e.g., when the condition of the radio network between the UE 108 and the RAN node 104 is poor). By delaying the paging response until the condition of the radio network improves, a power consumption of the UE 108 may be improved. For example, the estimated uplink (UL) power to reach the RAN node 104 when the condition of the radio network is good may be less than when the condition of the radio network is poor. As a result, by waiting for the condition of the radio network to improve, the UE 108 may be able to reduce the amount of power needed for the UL operation. Thereby power consumption of the UE 108 can be improved since the transmission power is reduced and, in some cases, retransmissions can be avoided.

In addition, a paging message is often a prelude to the UE 108 performing a DL operation to download data. Delaying the response to the paging message may also delay the DL operation, which was the rationale for the paging message. By delaying the response until a better channel condition exists, an increased data rate may be achieved for a fixed data allocation as the efficient coding rate can be higher (less redundancy bits). The increased data rate may reduce a communication time used for the DL operation, and thereby the power consumption may be reduced.

The option to allow the UE 108 to wait to transmit a paging response will be referred to herein as "delayed paging response." In some embodiments, the UE 108 may indicate its support for delayed paging response to the RAN node 104 (e.g., during registrations with the network). Delayed paging concepts are proposed in "3GPP; Technical Specification Group Services and System Aspects; Study on Cellular IoT support and evolution for the 5G System (Release 16) v1.0.0 (2018-09)," Solution 33, pp 192-195.

In other embodiments of the inventive concept, the core network 120 and/or the RAN node 104 may delay paging the UE 108 in response to receiving a request to trigger the paging procedure. The core network 120 and/or the RAN node 104 may delay paging in the network under similar circumstances for which the UE 108 may perform a delayed paging response. That is, the core network 120 and/or the RAN node 104 may delay paging the UE 108 so as to delay downloading delay tolerant data to the UE 108 based on an expectation that the UE 108 power consumption may be relatively high due to the characteristics of the propagation channel. The halting of the UE paging event may be based on historical and/or current characteristics of a propagation channel for data communication associated with the UE 108. For delay tolerant data, it may be more efficient to delay paging the UE until propagation channel conditions have improved so as to improve throughput and reduce energy consumption even if the delay is substantially longer than the next eDRX cycle, such as days or weeks.

Figure 2:
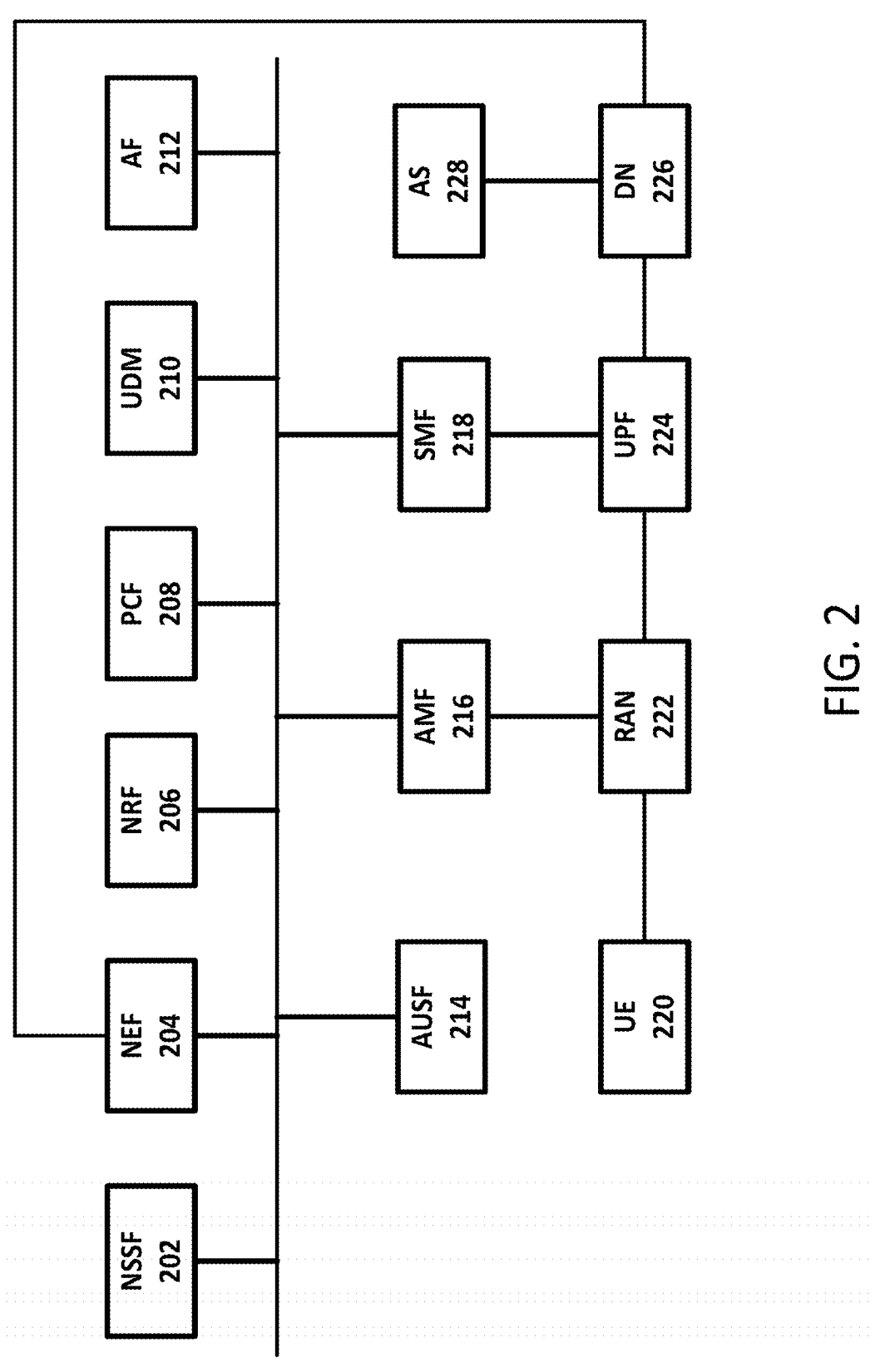
FIG. 2 is a block diagram of nodes and functional elements in a wireless communication network in accordance with some embodiments of the inventive concept.

FIG. 2 is a block diagram of nodes and functional elements in a wireless communication network in accordance with some embodiments of the inventive concept. Referring to FIG. 2, functional nodes in an example 5G core network including a RAN node are illustrated. The wireless network includes a network slice selection function (NSSF) node 202, a network exposure function (NEF) node 204, a network function repository function (NRF) node 206, a policy control function (PCF) 208, a unified data management (UDM) node 210, an application function (AF) node 212, an authentication server function (AUSF) node 214, an access and mobility management function (AMF) node 216, a session management function (SMF) node 218, a UE 220, a RAN node 222, a user plan function (UPF) node 224, a data network (DN) 226, e.g., Internet, and an application server 228, which are configured as shown. The AMF node 216 may be configured to support termination of NAS signaling, NAS ciphering and integrity protection, registration management, connection management, mobility management, access authentication and authorization, and/or security context management. The SMF node 218 may be configured to support session management (session establishment, modification, release), UE IP address allocation and management, DHCP functions, termination of NAS signaling related to session management, DL data notification, and/or traffic steering configuration for UPF 224 for proper traffic routing. The UPF node 224 may be configured to support packet routing & forwarding, packet inspection, QoS handling, to act as external PDU session point of interconnect to the DN 226, and may be an anchor point for intra/inter-RAT mobility. The PCF node 208 may be configured to support a unified policy framework, to provide policy rules to CP functions, and/or to access subscription information for policy decisions. The AUSF node 214 may be configured to act as an authentication server. The UDM node 210 may be configured to support generation of authentication and key agreement (AKA) credentials, user identification handling, access authorization, and/or subscription management. The AF node 212 may be configured to support application influence on traffic routing, accessing the NEF 204, and/or interaction with policy framework for policy control. The NEF module 204 may be configured to support exposure of capabilities and events, secure provision of information from external application to a 3GPP network, and/or translation of internal/external information. The NRF node 206 may be configured to support service discovery function, and/or NF profile maintenance and available NF instances. The NSSF node 202 may be configured to support selecting of the network slice instances to serve the UE, determining the allowed NSSAI, determining the AMF node 216 set to be used to serve the UE.

Figure 3A:
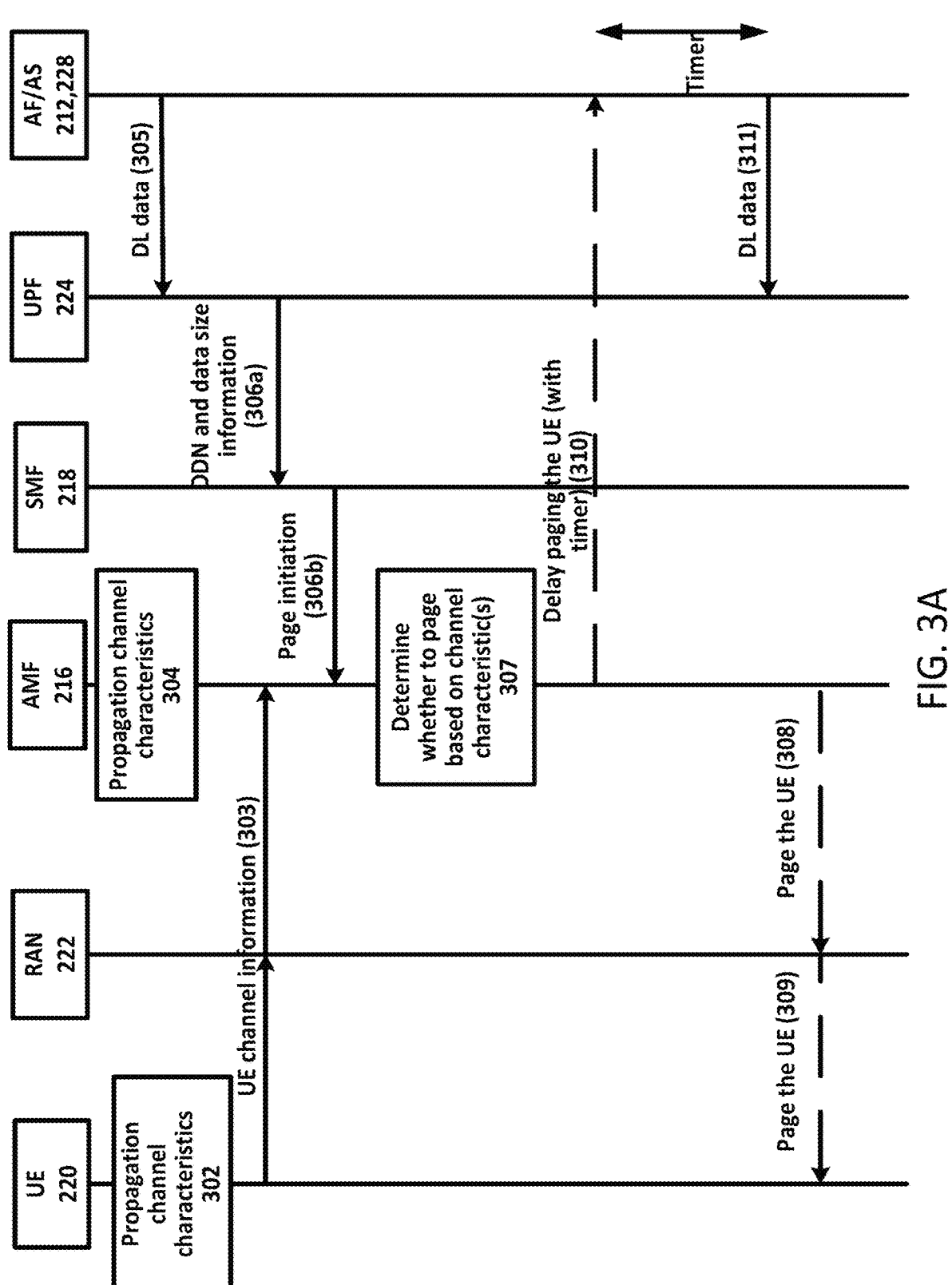
FIGS. 3A-3C are message flow diagrams that illustrate delaying a UE paging operation in a network based on propagation channel characteristics in accordance with some embodiments of the inventive concept.
Figure 3B:
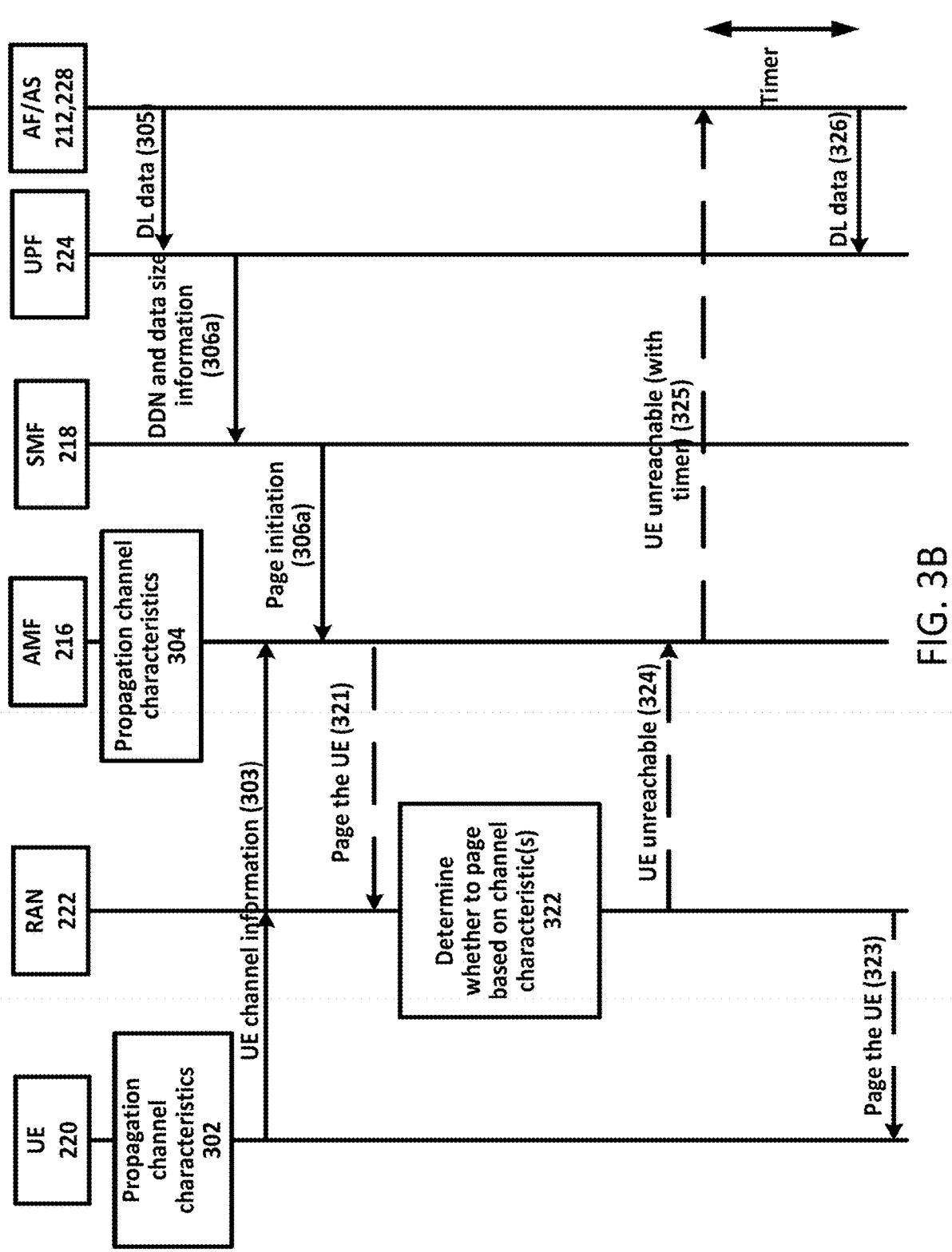
Figure 3C:
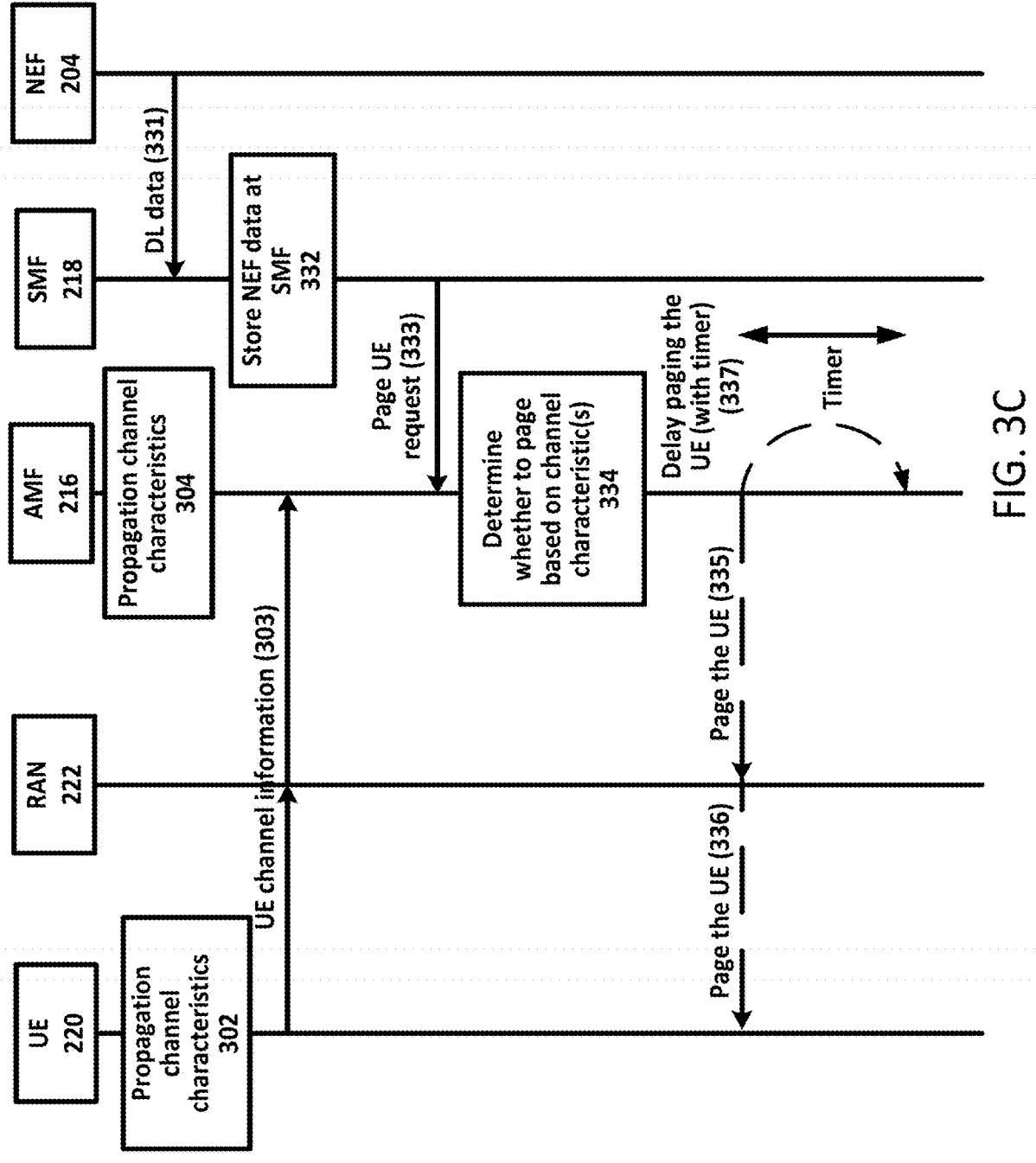

FIGS. 3A-3C are message flow diagrams that illustrate delaying a UE paging operation in a network based on propagation channel characteristics in accordance with some embodiments of the inventive concept. As shown in FIG. 3A, the UE 220 and/or the AMF node 216 may compile measurements that include statistics of the power consumption used during DL and/or UL operations at the UE 220 and propagation channel quality measurements for the data communication channel. The power consumption used and the DL measurements 302 may be compiled in the UE 220 and forwarded (303) to the AMF node 216 by way of the RAN node 222 upon request. The measurements performed in the UE 220, such as DL performance measurements and the measurements reported to the AMF node 216 by way of the RAN node 222 in the RRC procedure, i.e., a "UE Information" report is specified in 3GPP TS 36.331. These measurements may include, but are not limited to, a random access channel (RACH) report that comprises a number of preambles used during an RACH attempt, a radio link failure (RLF) report that comprises radio link failure information or cellular handover information associated with the UE, a measurement report, logMeasReport, that comprises power and quality measurements on a radio access network (RAN) node that currently serves the UE, or a history report, mobilityHistoryReport, that comprises information on UE movement between recently visited base stations. In some embodiments, the mobiliyHistoryReport may include historical information related to cell reselections by a UE. These cell-reselections may be indicative of the quality of data communication propagation channel(s) associated with these cell(s), i.e., a UE may move from cells with poorer channel quality to those with better channel quality. The AMF node 216 may compile UL power or quality measurements (304) that may be acquired by the RAN node 222. These measurements may include sounding reference symbols (SRS) transmitted from the UE 220, which are indicative of the propagation channel quality. The AF/AS 212, 228 may provide DL data (305) to the UPF 224, which generates a request to trigger the paging procedure for the UE 220 by sending a downlink data notification (DDN) to the SMF node 218 (306*a*), which forwards the DDN to the AMF node 216 (306*b*) to initiate the paging process. The DDN may include information related to the size of the DL data provided by the AF/AS 212, 228. The AMF node 216 may determine, responsive to receiving the request to trigger the paging procedure, whether to page the UE 220 based on characteristics of a propagation channel for data communication associated with the UE 220 (307). The decision whether to proceed with the paging procedure or to halt paging may be based on information/measurements in which area the UE 220 is camping or was camping when the AMF node 216 was last updated. In other embodiments, the paging decision may be based on UE 220 measurements, e.g., "mobility history" reported in the "UE information" report. If the AMF node 216 determines to proceed with paging, then a paging request is sent to the RAN node 222 (308), which in turn pages the UE 220 (309). If the AMF node 216 determines that paging should be delayed, then the AMF node 216 may report back to the AF/AS 212, 228 that paging should be delayed. In some embodiments, a suggested timer is provided with the notification recommending to the AF/AS 212, 228 that the DL data should not be sent to the UPF node 224 until after the time has expired (311). In other embodiments, the AF/AS 212, 228 may wait to be notified by the AMF node 216 before re-sending the DL data to the UPF node 224.

Referring now to FIG. 3B, a determination whether to page the UE 220 may also be made in the RAN node 222, in this embodiment, the AMF node 216 may, in response to receiving the request to trigger paging of the UE 220 (306), i.e., the DDN, send a paging request to the RAN node 222 (321). The RAN node 222 may determine whether to page the UE 222 based on characteristics of a propagation channel for data communication associated with the UE 220 (322). In some embodiments, the decision in the RAN node 222 may be based on measurement reports from the UE 220 including the statistics collected in the UE or from existing measurements reported in the "UE information" messages as specified in 3GPP TS 36.331. This information may have been reported in previous DRX cycles or in response to a request from the RAN node 222 and/or AMF node 216. If the RAN node 222 determines to proceed with paging, then the UE is paged (323). If the RAN node 222 determines that paging should be delayed, then the RAN node 222 may inform the AMF node 216 in the "N2 paging response" that the UE 220 is considered to be in a bad coverage area and is not reachable (324). The AMF node 216 may then report back to the AF/AS 212, 228 that the UE is unreachable (325). In some embodiments, a suggested timer is provided with the notification recommending to the AF/AS 212, 228 that the DL data should not be sent to the UPF 224 until after the time has expired (326). In other embodiments, the AF/AS 212, 228 may wait to be notified by the AMF node 216 before re-sending the DL data to the UPF node 224.

In other embodiments of the inventive concept, when the UE 220 is in an RRC_Inactive state the AS 228, for example, would provide the DL data to the UPF 224, which would provide the DL data directly to the RAN node 222, which would determine whether to page the UE 220 based on the characteristics of the propagation channel for data communication associated with the UE 220 in accordance with the embodiments described herein.

FIG. 3A illustrates embodiments in which a decision whether to proceed with paging a UE 220 is performed in a core network node, i.e., AMF node 216 and FIG. 3B illustrates embodiments in which a decision whether to proceed with paging a UE 220 is performed in a RAN node 222. It will be understood that in other embodiments of the inventive concept that the decision whether to proceed with paging a UE 220 may be performed in part in a core network node, such as the AMF node 216 and in a RAN node 222.

FIGS. 3A and 3B illustrate embodiments in which DL data is provided to the core network by way of the UPF 224. FIG. 3C illustrates embodiments in which the AF/AS 212, 228 provide the DL data to the NEF node 204, which forwards (331) the DL data to the SMF node 218 for storage thereon (332). The SMF node 218 will send a request (333) to trigger paging of the UE 220. The AMF node 216 may determine, responsive to receiving the request to trigger the paging procedure, whether to page the UE 220 based on characteristics of a propagation channel for data communication associated with the UE 220 (334). The decision whether to proceed with the paging procedure or to halt paging may be based on information/measurements in which area the UE 220 is camping or was camping when the AMF node 216 was last updated. In other embodiments, the paging decision may be based on UE 220 measurements, e.g., "mobility history" reported in the "UE information" report. If the AMF node 216 determines to proceed with paging, then a paging request is sent to the RAN node 222 (335), which in turn pages the UE 220 (336). If the AMF node 216 determines that paging should be delayed, then the AMF node 216 may delay for a predetermined time (337) before evaluating again whether to proceed with paging the UE 220.

Figure 4:
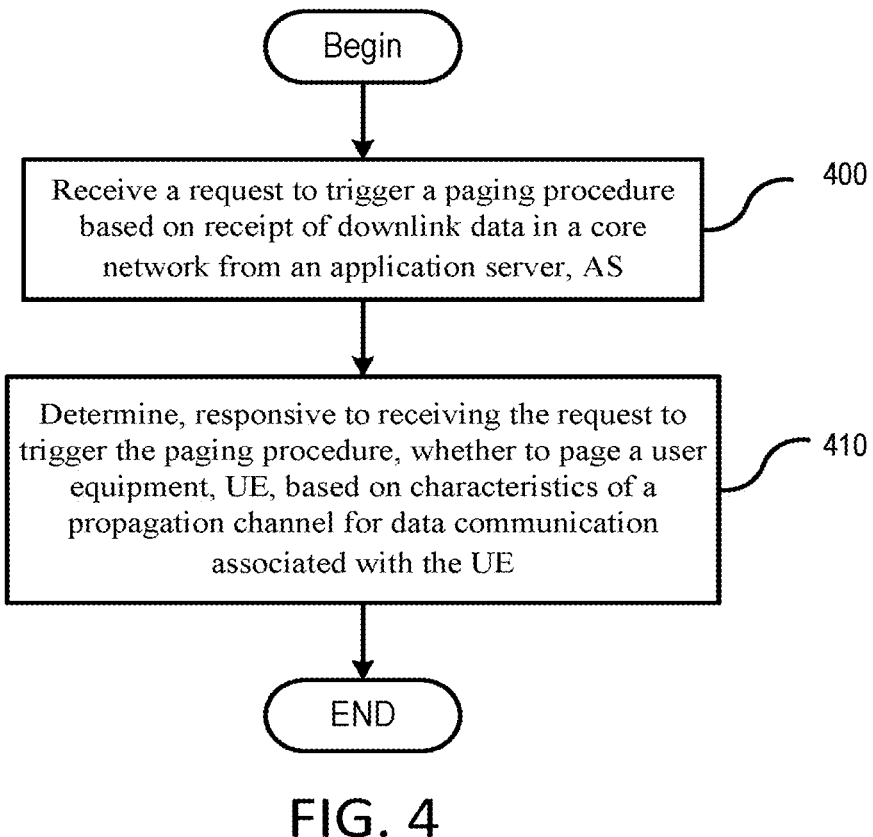

FIGS. 4-22 are flowcharts that illustrate delaying a UE paging operation in a network based on propagation channel characteristics in accordance with some embodiments of the inventive concept. Referring to FIG. 4, operations of a network node, such as an AMF node 216 or a RAN node 222, according to some embodiments of the inventive concept, may comprise receiving a request to trigger a paging procedure based on receipt of downlink data in a core network from an AF/AS 212, 228 (block 400) and determining, responsive to receiving the request to trigger the paging procedure, whether to page a UE 220 based on characteristics of a propagation channel for data communication associated with the UE 220 (block 410).

Figure 5:
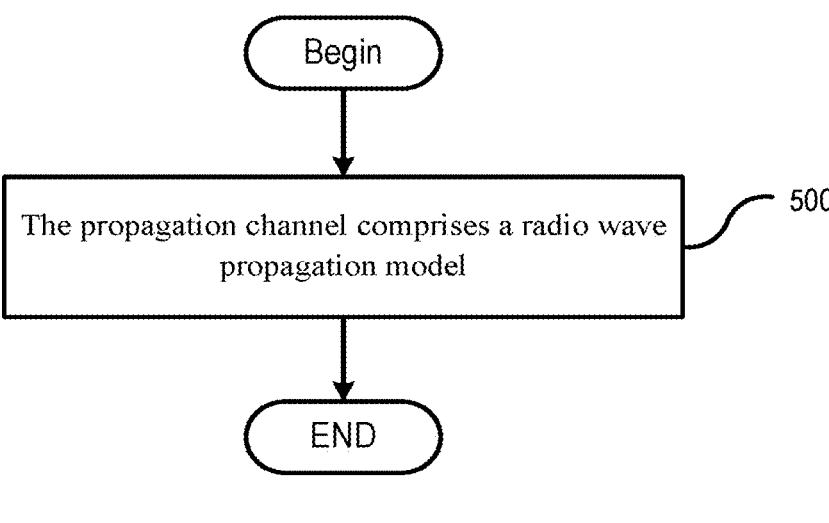

Referring to FIG. 5, the propagation channel may comprise a radio wave propagation model (block 500). The radio wave propagation model may comprise a mathematical representation of, for example, the transfer function associated with the propagation channel.

Referring to FIG. 6, the characteristics of the propagation channel may be based on data communication channel information comprising sounding reference symbols (SRS) transmitted from the UE 220, a random access channel (RACH) report that comprises a number of preambles used during an RACH attempt, a radio link failure (RLF) report that comprises radio link failure information or cellular handover information associated with the UE 220, a measurement report, logMeasReport, that comprises power and quality measurements on a RAN node 222 that currently serves the UE 220, and/or a history report, mobilityHistoryReport, that comprises information on UE 220 movement between recently visited base stations (block 600).

Referring to FIG. 7, the characteristics of the propagation channel may be associated with the RAN node 222 that currently serves the UE 220 (block 700).

Figures 8, 9, 10:
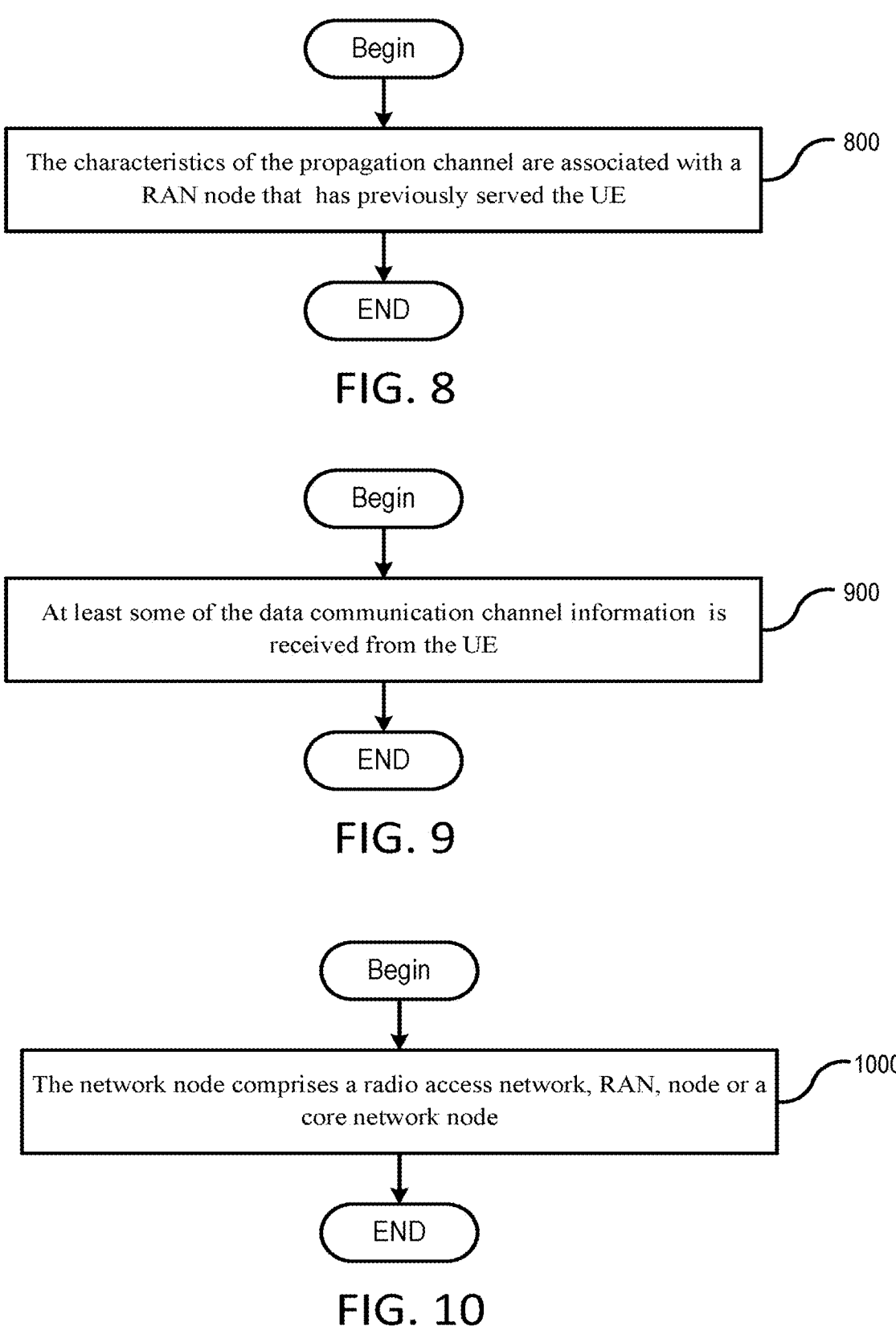

Referring to FIG. 8, the characteristics of the propagation channel may be associated with a RAN node 222 that has previously served the UE 220 (block 800).

Referring to FIG. 9, at least some of the data communication channel information may be received from the UE 220 (block 900).

Referring to FIG. 10, the network node may comprise a RAN node 222 or a core network node 216 (block 1000).

Referring to FIG. 11, the core network node may comprise an AMF node 216 (block 1100).

Referring to FIG. 12, the network node may comprise a RAN node 222 and a core network node 216. Determining whether to page the UE 220 may be performed in part by the RAN node 222 and in part by the core network node 216 (block 1200).

Referring to FIG. 13, in still other embodiments, an instruction may be sent to a UPF node 224 to discard the downlink data from the AF/AS 212, 228 responsive to a determination not to page the UE 220 (block 1300).

Figures 14, 15, 16:
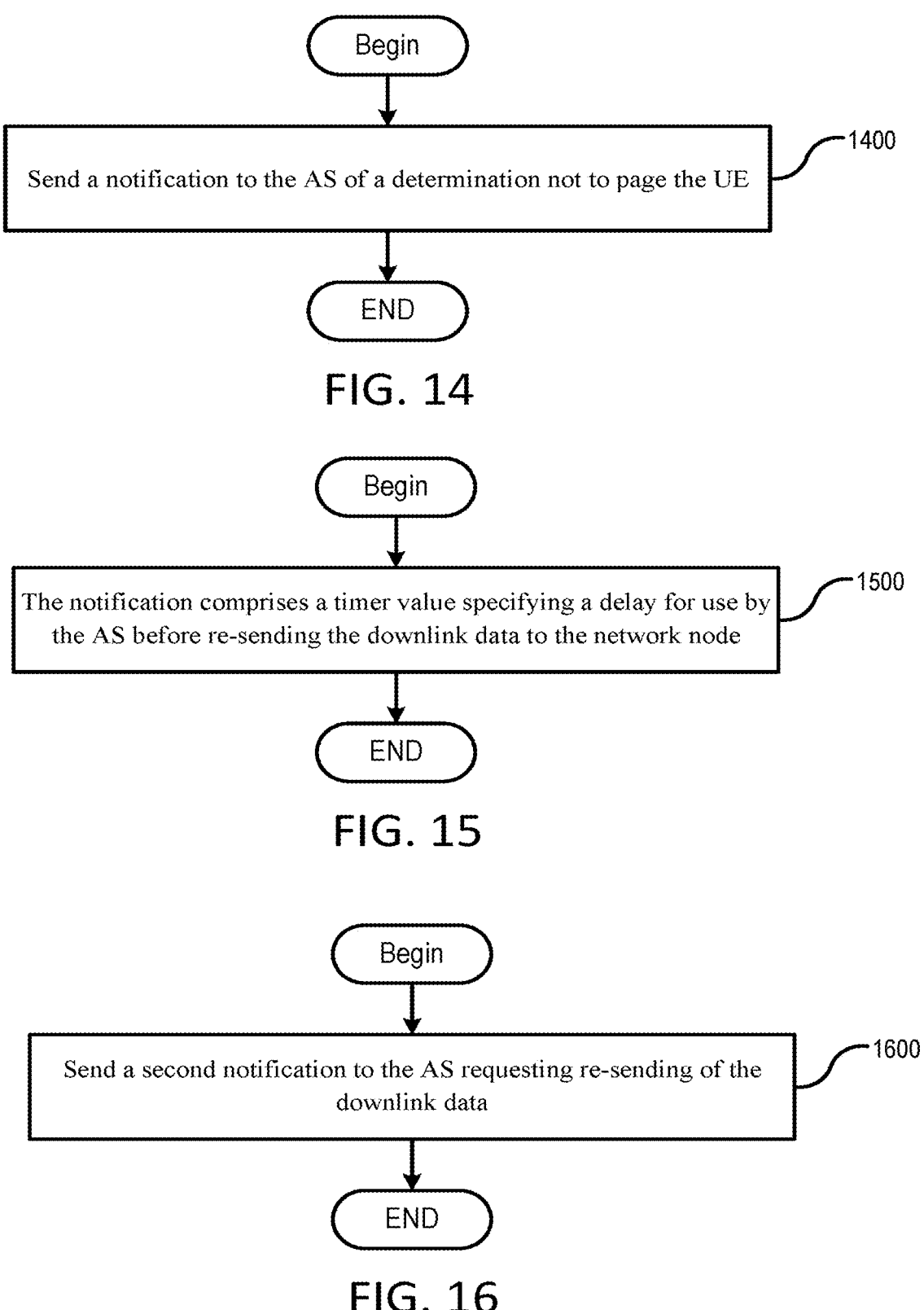

Referring to FIG. 14, a notification may be sent to the AF/AS 212, 218 of a determination not to page the UE 220 (block 1400).

Referring to FIG. 15, the notification may comprise a timer value specifying a delay for use by the AF/AS 212, 218 before re-sending the downlink data to the network node (block 1500).

Referring to FIG. 16, the notification may be a first notification, and a second notification may be sent to the AF/AS 212, 218 requesting re-sending of the downlink data (block 1600).

Referring to FIG. 17, the downlink data may be associated with a delay tolerant service, the UE 220 may be a cellular Internet of Things, CIoT, device, the AF/AS 212, 218 may be configured with an API network based delayed paging interface, and/or the downlink data may exceed a defined size threshold associated with an energy consumption quantity by the UE 220 in performing a download of the downlink data (block 1700).

Referring to FIG. 18, a page of the UE 220 may be initiated responsive to a determination to page the UE 220 based on the characteristics of the propagation channel associated with the UE (block 1800).

Figures 19, 20:
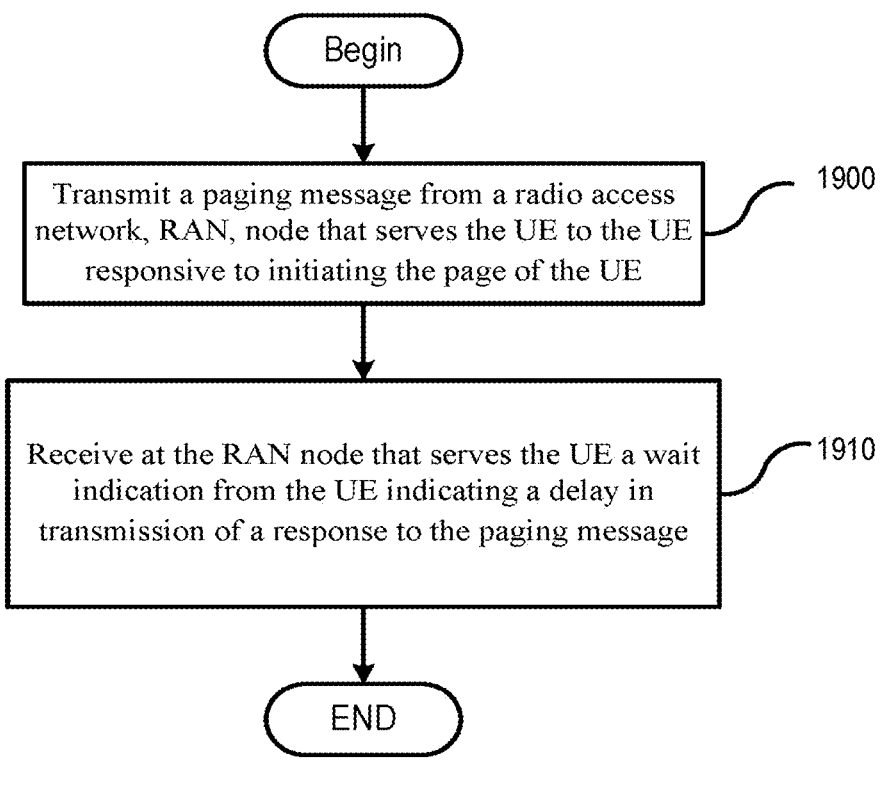

Referring to FIG. 19, a paging message may be transmitted from a RAN node 222 that serves the UE 220 to the UE 220 responsive to initiating the page of the UE 220 (block 1900) and a wait indication from the UE 220 may be received at the RAN node 222 that serves the UE 220 indicating a delay in transmission of a response to the paging message (block 1910).

Referring to FIG. 20, the network node may comprise the RAN node 222 that serves the UE 220 (block 2000).

Figures 21, 22:
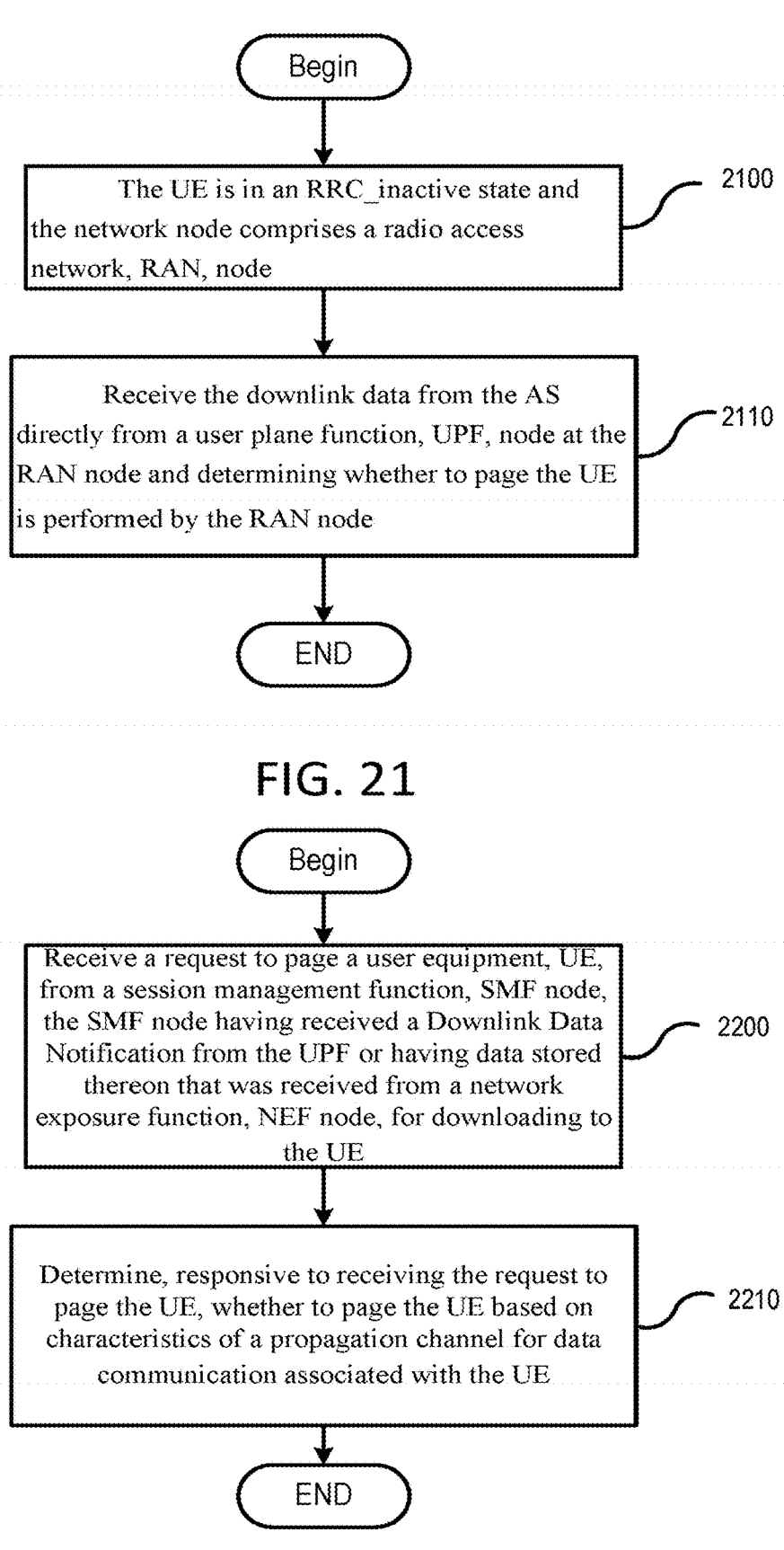

Referring to FIG. 21, the UE 220 may be in an RRC_inactive state and the network node may comprise a RAN node 222 (block 2100). The downlink data may be received from the AF/AS 212, 228 directly from a UPF node 224 at the RAN node 222. Determining whether to page the UE 220 may be performed by the RAN node 222 (block 2110).

Referring to FIG. 22, operations of a core network node, such as an AMF 216, may comprise receiving a request to page a UE 220 from an SMF node 218. The SMF node 218 may receive Downlink Data Notification from the user plane function node (UPF) or have data stored thereon that was received from an NEF node 204 for downloading to the UE 220 (block 2200). Operations may further comprise determining, responsive to receiving the request to page the UE 220, whether to page the UE 220 based on characteristics of a propagation channel for data communication associated with the UE 220 (block 2210).

Figure 23:
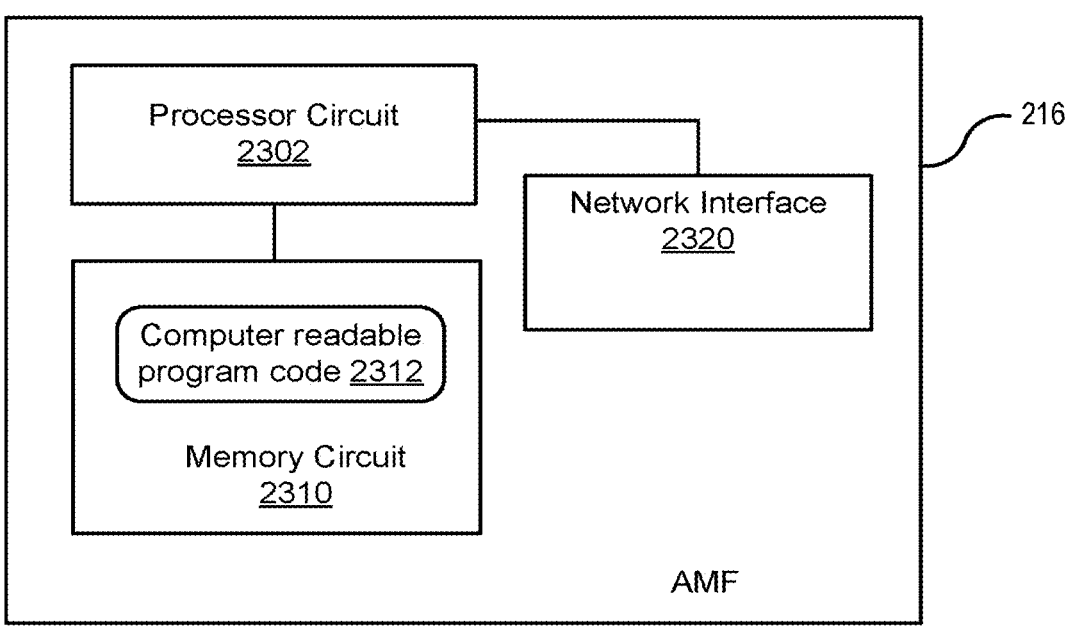
FIG. 23 is a block diagram that illustrates a core network node in accordance with some embodiments of the inventive concept.

FIG. 23 is a block diagram that illustrates a core network node, such as an AMF node 216, which is configured to perform operations according to one or more embodiments described herein. The AMF node 216 comprises a processor circuit 2302, a memory circuit 2310, and a network interface 2320. The network interface 2320 may be configured to implement wireless communication protocols including, but not limited to, those supported by 5G NR wireless communication networks. The processor circuit 2302 may comprise one or more data processing circuits, such as a general purpose and/or special purpose processor, e.g., microprocessor and/or digital signal processor. The processor circuit 2302 is configured to execute the computer readable program code 2312 in the memory circuit 2310 to perform at least some of the operations described herein as being performed by a core network node, such as the AMF 216.

Figure 24:
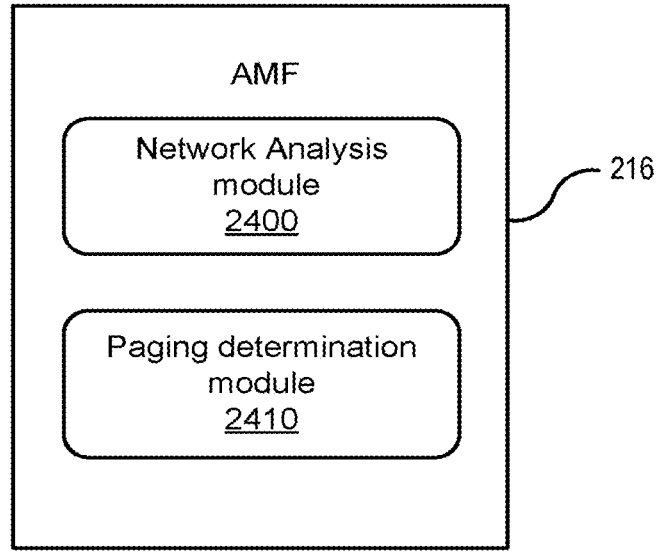
FIG. 24 is a block diagram that illustrates functional modules in a core network node in accordance with some embodiments of the inventive concept.

FIG. 24 is a block diagram that illustrates functional modules in a core network node, such as an AMF node 216 according to some embodiments of the inventive concept. The AMF node 216 comprises a network analysis module 2400, which is configured to collect and compile the information on the characteristics of the propagation channel for data communication associated with a UE 220 as described herein, and a paging determination module 2410, which is configured to perform a determination of whether to page a UE 220 based on the propagation channel characteristics for data communication associated with the UE 220 as described herein.

Figure 25:
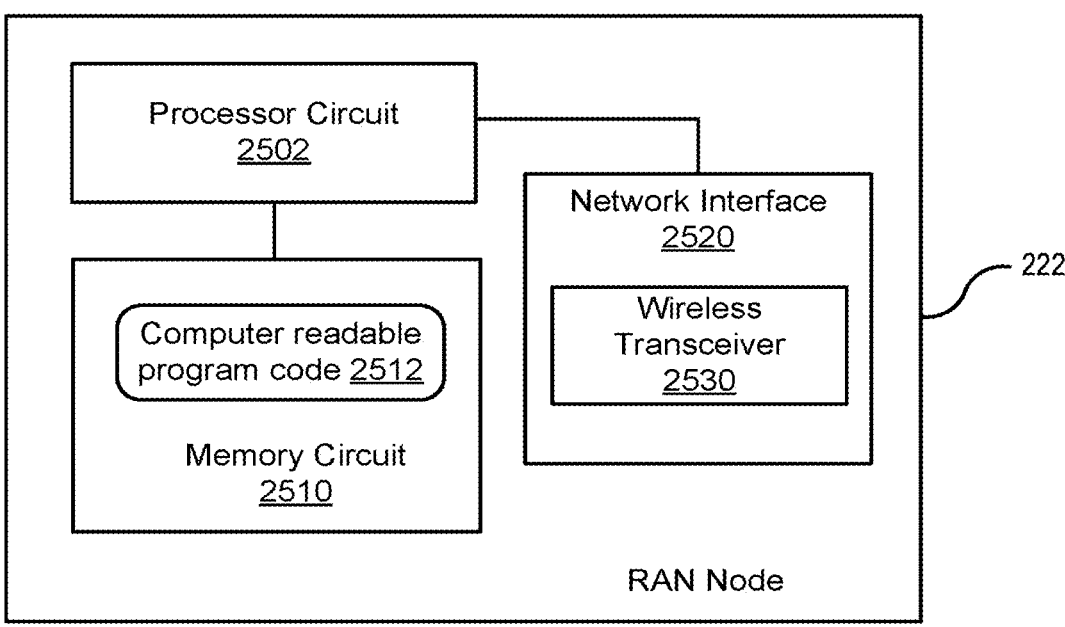
FIG. 25 is a block diagram that illustrates a radio access network (RAN) node in accordance with some embodiments of the inventive concept.

FIG. 25 is a block diagram that illustrates a RAN node 222, which is configured to perform operations according to one or more embodiments described herein. The RAN node 222 comprises a processor circuit 2502, a memory circuit 2510, and a network interface 2520. The network interface 2520 comprises a wireless transceiver 2530 configured to implement wireless communication protocols including, but not limited to, those supported by 5G NR wireless communication networks. The processor circuit 2502 may comprise one or more data processing circuits, such as a general purpose and/or special purpose processor, e.g., microprocessor and/or digital signal processor. The processor circuit 2502 is configured to execute the computer readable program code 2512 in the memory circuit 2510 to perform at least some of the operations described herein as being performed by the RAN node 222.

Figure 26:
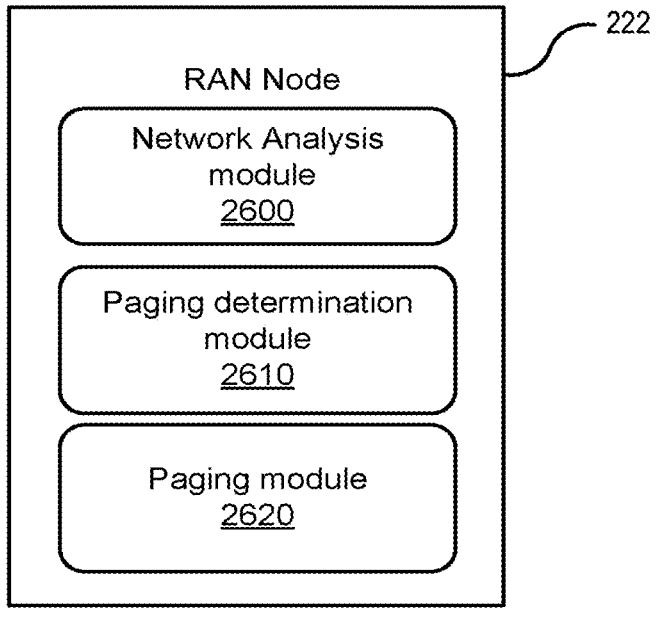
FIG. 26 is a block diagram that illustrates functional modules in a RAN node in accordance with some embodiments of the inventive concept.

FIG. 26 is a block diagram that illustrates functional modules in a RAN node 222 according to some embodiments of the inventive concept. The RAN node 222 comprises a network analysis module 2600, which is configured to collect and compile the information on the characteristics of the propagation channel for data communication associated with a UE 220 as described herein, a paging determination module 2610, which is configured to perform a determination of whether to page a UE 220 based on the propagation channel characteristics for data communication associated with the UE 220 as described herein, and a paging module 2620, which is configured to perform the paging of the UE 220.

FURTHER DEFINITIONS AND EMBODIMENTS

In the above-description of various embodiments, it is to be understood that the terminology used herein is for the purpose of describing particular embodiments only and is not intended to be limiting of the embodiments as described herein. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Like numbers refer to like elements throughout the description. Thus, the same or similar numbers may be described with reference to other drawings even if they are neither mentioned nor described in the corresponding drawing. Also, elements that are not denoted by reference numbers may be described with reference to other drawings.

When an element is referred to as being "connected," "coupled," "responsive," or variants thereof to another element, it can be directly connected, coupled, or responsive to the other element or intervening elements may be present. In contrast, when an element is referred to as being "directly connected," "directly coupled," "directly responsive," or variants thereof to another element, there are no intervening elements present. Furthermore, "coupled," "connected," "responsive," or variants thereof as used herein may include wirelessly coupled, connected, or responsive. As used herein, the singular forms "a," "an," and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise," "comprising," "comprises," "include," "including," "includes," "have," "has," "having," or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices), and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module," or variants thereof.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles of the present invention. All such variations and modifications are intended to be included herein within the scope of the present invention.

What is claimed is:

1. A method of operating a network node comprising an access mobility management function (AMF) node, the method comprising:

receiving, by the AMF, a request to trigger paging of a user equipment (UE) based on receipt of downlink data in a core network from an application server (AS);

determining, by the AMF, expected power consumption used for data communication associated with the UE, based on quality characteristics of a propagation channel that currently serves the UE;

determining, by the AMF, responsive to receiving the request to trigger the paging, when to delay paging of the UE, based on the expected power consumption by the UE;

delaying the paging of the UE by the AMF node, based on the determining of when to delay paging of the UE based on the expected power consumption by the UE; and paging, by the AMF, the UE, when the quality characteristics of the propagation channel improves based on reduced expected power consumption used for data communication associated with the UE, responsive to the determining when to delay paging of the UE.

2. The method of claim 1, wherein the propagation channel comprises a radio wave propagation model.

3. The method of claim 1, wherein the quality characteristics of the propagation channel are based on information comprising:

measurements of sounding reference symbols (SRS) transmitted from the UE, a random access channel (RACH) report that comprises a number of preambles used during an RACH attempt;

a radio link failure (RLF) report that comprises radio link failure information or cellular handover information associated with the UE;

a measurement report, logMeasReport, that comprises power and quality measurements on a radio access network (RAN) node that currently serves the UE; or a history report, mobilityHistoryReport, that comprises information on UE movement between recently visited RAN nodes.

4. The method of claim 3, wherein the quality characteristics of the propagation channel are associated with the RAN node that currently serves the UE.

5. The method of claim 3, wherein the quality characteristics of the propagation channel are associated with a RAN node that has previously served the UE.

6. The method of claim 3, wherein at least some of data communication channel information is received from the UE.

7. The method of claim 1, wherein the network node comprises a radio access network, RAN, node and a core network node.

8. The method of claim 1, further comprising:

sending an instruction to a user plane function, UPF, node to discard the downlink data from the AS responsive to a determination to delay paging of the UE.

9. The method of claim 1, further comprising:

sending a notification to the AS of a determination to delay paging of the UE.

10. The method of claim 9, wherein the notification comprises a timer value specifying a delay for use by the AS before re-sending the downlink data to the network node.

11. The method of claim 9, wherein the notification is a first notification, the method further comprising:

sending a second notification to the AS requesting re-sending of the downlink data.

12. The method of claim 1, wherein the downlink data is associated with a delay tolerant service, the UE is a cellular Internet of Things, CIoT, device, the AS is configured with an API network based delayed paging interface, or the downlink data exceeds a defined size threshold associated with an energy consumption quantity by the UE in performing a download of the downlink data.

13. The method of claim 1, further comprising:

initiating a page of the UE responsive to a determination not to delay paging of the UE based on the quality characteristics of the propagation channel associated with the UE; and transmitting a paging message from a radio access network, RAN, node that serves the UE to the UE responsive to initiating the page of the UE.

14. The method of claim 13, wherein the network node comprises the RAN node that serves the UE.

15. The method of claim 1, wherein the UE is in an RRC_inactive state, and wherein the network node comprises a radio access network (RAN) node, the method further comprising:

receiving the downlink data from the AS directly from a user plane function (UPF) node at the RAN node; and wherein determining whether to page the UE is performed by the RAN node.

16. The method of claim 1, wherein the quality characteristics of the propagation channel improves in relation to a threshold when expected power consumption used for data communication associated with the UE is reduced.

17. The method of claim 1, wherein a decision whether to delay the paging of the UE is based on measurements in an area where the UE is located when determining whether to delay the paging of the UE based on the quality characteristics of the propagation channel.

18. The method of claim 1, wherein the AMF node is configured to compile the quality characteristics of the propagation channel.

19. The method of claim 1, further comprising:

notifying a user plane function (UPF) node to discard the downlink data from the AS responsive to a determination to delay paging of the UE.

20. The method of claim 19, wherein the notifying the UPF node to discard the downlink data is based on a notification by the AMF to a session management function (SMF) node.

* * * * *